US012153380B2

(12) United States Patent
Verardo et al.

(10) Patent No.: US 12,153,380 B2
(45) Date of Patent: Nov. 26, 2024

(54) BALANCE SPRING AND METHOD FOR MANUFACTURING THE SAME

(71) Applicant: Nivarox-FAR S.A., Le Locle (CH)

(72) Inventors: Marco Verardo, Les Bois (CH); Christian Charbon, Chezard-St-Martin (CH)

(73) Assignee: NIVAROX-FAR S.A., Le Locle (CH)

( * ) Notice: Subject to any disclaimer, the term of this patent is extended or adjusted under 35 U.S.C. 154(b) by 1293 days.

(21) Appl. No.: 16/674,096

(22) Filed: Nov. 5, 2019

(65) Prior Publication Data

US 2020/0192292 A1 Jun. 18, 2020

(30) Foreign Application Priority Data

Dec. 12, 2018 (EP) .................................... 18211865

(51) Int. Cl.
*G04B 17/06* (2006.01)

(52) U.S. Cl.
CPC ......... *G04B 17/063* (2013.01); *G04B 17/066* (2013.01)

(58) Field of Classification Search
CPC ..... G04B 17/063; G04B 17/066; G04B 17/06
See application file for complete search history.

(56) References Cited

U.S. PATENT DOCUMENTS 10,969,745 B2 * 4/2021 Haemmerli .......... G04B 17/227
2006/0262652 A1 * 11/2006 Musy ........................ F16F 1/14 368/175
2013/0051191 A1 * 2/2013 Schafroth .............. G04C 3/047 368/175
2014/0286143 A1 * 9/2014 Stranczl ................. G04B 18/06 368/178
2014/0313866 A1 10/2014 Hessler et al.
2015/0253733 A1 * 9/2015 Stranczl ................. G04B 17/34 368/177
2017/0285573 A1 * 10/2017 Manousos ............. G04B 19/12
2017/0371300 A1 12/2017 Ikeda

FOREIGN PATENT DOCUMENTS

CH 711 275 A2 12/2016
CN 1985103 A 6/2007
CN 104007650 A 8/2014
CN 104025453 A 9/2014

(Continued)

OTHER PUBLICATIONS

Communication dated Feb. 17, 2021 from The Korean Intellectual Property Office in Application No. 10-2019-0160015.

(Continued)

*Primary Examiner* — Sean Kayes
(74) *Attorney, Agent, or Firm* — Sughrue Mion, PLLC

(57) ABSTRACT

A balance spring (1) intended to be fitted to a timepiece balance having fixed inertia, the balance spring (1) being formed of a core (10) having lateral faces (10*c*) connecting an upper face (10*a*) to a lower face (10*b*), the balance spring (1) including on one of the lateral faces (10) in one portion of the outer coil (5), a coating formed of one or more layers, the coating including two layers with a first electrically conductive layer (12) coated with a second outer layer (13) made of a ceramic, or a combined layer (13), made of an electrically conductive ceramic. Also a method of manufacturing this balance spring.

13 Claims, 1 Drawing Sheet

A - A

(56) References Cited

FOREIGN PATENT DOCUMENTS

| | | | |
|---|---|---|---|
| EP | 2 589 568 | A1 | 5/2013 |
| EP | 2590325 | A1 | 5/2013 |
| JP | 2015-501591 | A1 | 1/2015 |
| JP | 2016-513244 | A | 5/2016 |
| JP | 2016-164521 | A | 9/2016 |
| JP | 2017-032321 | A | 2/2017 |
| WO | 2013064351 | A1 | 5/2013 |
| WO | 2014146833 | A2 | 9/2014 |
| WO | 2016/093354 | A1 | 6/2016 |

OTHER PUBLICATIONS

Communication dated Feb. 3, 2021 from The State Intellectual Property Office of the P.R. of China in Application No. 201911273210.7.

European Search Report for EP 18 21 1865 dated May 27, 2019.

Communication dated Dec. 1, 2020 from the Japanese Patent Office in Application No. 2019-210210.

* cited by examiner

A - A

BALANCE SPRING AND METHOD FOR MANUFACTURING THE SAME

CROSS REFERENCE TO RELATED APPLICATION

This application claims priority from European Patent Application No. 18211865.3 filed Dec. 12, 2018, the contents of all of which are incorporated herein in its entirety.

FIELD OF THE INVENTION

The present invention relates to a balance spring intended to be fitted to a regulating member of a mechanical watch. It also relates to the method for manufacturing said balance spring.

PRIOR ART

There are several documents that disclose a method for depositing a coating on a temperature compensated silicon balance spring with a silicon oxide layer. The first object of this coating is to provide the balance spring with a conductive layer in order to release electrostatic charges and to avoid the coils sticking to each other or to elements of the movement such as the bridges, bars and plates. A second object of this coating is to protect the balance spring from the harmful action of moisture. To meet these objectives, Patent document No. EP1837721 discloses a balance spring with a silicon core and a thick silicon dioxide layer on which is made a metal deposition having a thickness of less than 50 nm.

These methods are successfully applied to the manufacture of balance springs used in movements equipped with balances having adjustable inertia. The balance spring with a fixed active length is generally bonded to the stud and the coating at the balance spring surface is not subjected to any contact and/or friction. With the democratization of the silicon balance spring, use is widespread for simpler movements with annular balances without inertia adjustment. A balance spring is associated with a balance and then the frequency of the oscillator is adjusted by adjusting the active length of the balance spring by means of an index assembly. The balance spring is generally guided between two pins and abuts against one and then against the other with each vibration of the balance. The contact and the movement between the balance spring surface and the pins can lead to premature wear of the conductive and moisture-resistant layer.

SUMMARY OF THE INVENTION

To overcome the aforecited drawbacks, the object of the present invention is to propose a balance spring having improved wear resistance in the contact area between the outer coil and the index pins.

It is also an object of the invention to provide such a balance spring that resists humidity while also having anti-static properties.

To this end, the invention concerns a balance spring intended to be fitted to a timepiece balance having fixed inertia, the balance spring being formed of a core having lateral faces connecting an upper face to a lower face, said balance spring comprising on at least one portion of its outer coil and on at least one of the lateral faces in said outer coil portion, a coating formed of one or more layers, said coating being characterized in that it includes:

two layers with a first electrically conductive layer having an antistatic and moisture barrier function, coated with a second outer layer made from a ceramic having an anti-wear function, or a so-called ‘combined’ layer made of an electrically conductive ceramic that combines the antistatic, moisture barrier and anti-wear functions.

Thus, the balance spring includes on its outer coil, at least in the area of contact with the index pins, a ceramic layer which ensures the durability of the underlying material in the contact area and thus, generally, improved resistance to wear of the balance spring.

According to a variant, the underlying material is the constituent material of the first electrically conductive layer which is either directly deposited on the balance spring core, or deposited on an intermediate layer, such as a temperature compensation layer.

According to another variant wherein the wear-resistant ceramic layer is also conductive, the underlying material is the balance spring core material or the intermediate temperature compensation layer material.

The balance spring manufacturing method consists in depositing said ceramic layer on at least one of the lateral faces of the balance spring intended to be in contact with the pins during use. This layer has a thickness comprised between 5 and 100 nm, and, preferably, between 20 and 50 nm. Preferably, it extends over a portion of the outer coil on an arc of a circle comprised between 10 and 60°, and, more preferably, between 30 and 40°.

According to particular embodiments of the invention, the balance spring also has one or a suitable combination of the following features:

- said second outer layer is made of a ceramic based on carbides, nitrides, borides or oxides;
- said second outer layer is made of a ceramic based on silicon carbide;
- the combined layer is made of a ceramic based on possibly doped oxides or based on borides;
- the combined layer is made of a fluoride-doped tin dioxide, an indium and tin oxide, a zinc oxide possibly doped with aluminium, or a titanium boride;
- the first layer is a metal layer;
- the first layer is made of a metal chosen from among gold, platinum, rhodium, palladium, tantalum, chromium and vanadium;
- each of the lateral faces has, in said outer coil portion, a first layer and a second outer layer or the combined layer;
- each of the lateral faces has, in said outer coil portion, the temperature compensation layer underneath the first layer or underneath the combined layer.

The present invention also relates to a balance spring intended to be fitted to a timepiece balance having fixed inertia, said balance spring being formed of a silicon core having lateral faces connecting an upper face to a lower face, said balance spring being coated on at least one of the lateral faces in a portion of its outer coil with a ceramic layer with the exception of a silicon oxide, said layer being directly deposited on the silicon core and having a thickness comprised between 5 and 100 nm and, preferably, between 20 and 50 nm, said balance spring comprising, apart from said portion, on all or part of the lateral, lower or upper faces, a silicon oxide layer in order to compensate for variations in the thermoelastic coefficient of the core with temperature, coated with a metal layer.

Other features and advantages of the present invention will appear in the following description of a preferred embodiment, given by way of non-limiting example, with reference to the annexed drawings.

DETAILED DESCRIPTION

Figure 1A:
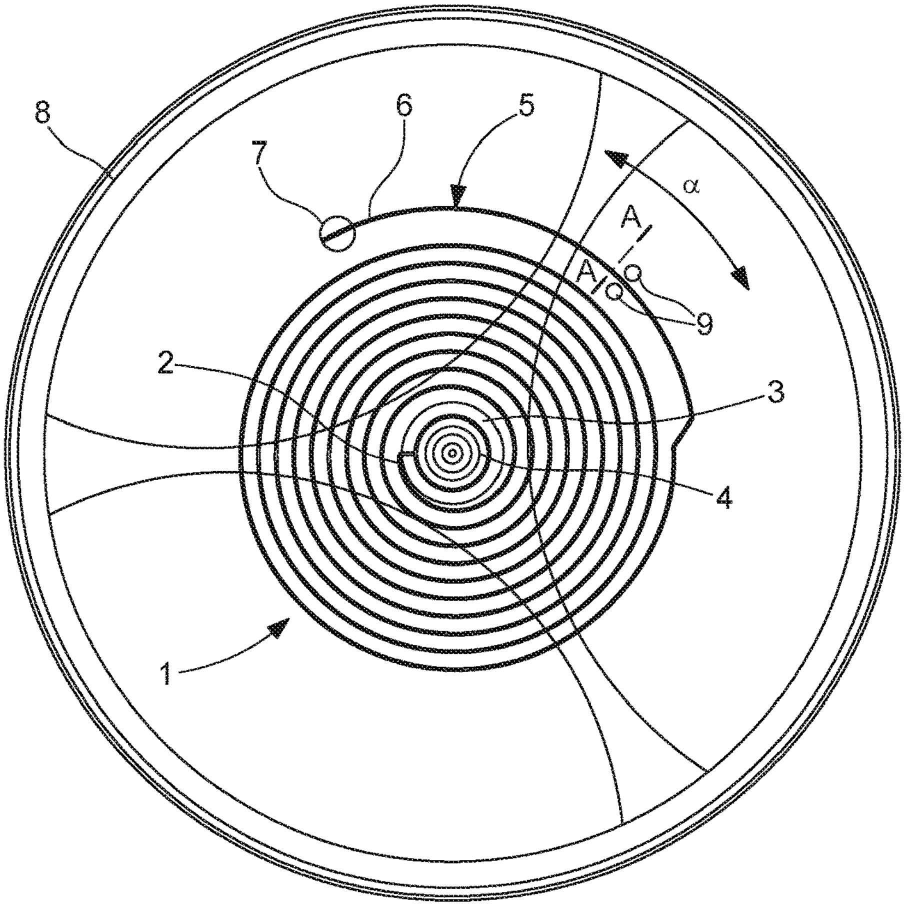
FIG. 1A is a top view of a balance spring according to the invention mounted on its balance.

The present invention relates to a balance spring more specifically intended to be fitted to a balance having fixed inertia. In a known manner, as represented in FIG. 1A, balance spring 1 has an inner end 2 via which it is attached to a collet 3 fitted on a staff 4 of balance 8. Particularly in the case of a balance spring made from silicon, quartz or ceramic, the collet is made in one piece with the balance spring. Balance spring 1 includes an outer coil 5 which ends in an end 6 attached to a balance spring stud 7. The stud is integral with a balance cock (not represented) secured to the movement plate. Before the point of attachment to the stud, the outer coil passes between the index pins 9. In this particular area, which will be referred to as the 'contact area', the two lateral faces of the balance spring respectively abut against one pin and then against the other pin with each vibration of the balance. In some configurations of the balance/balance spring assembly, it is also possible for only one of the lateral faces to abut against one of the pins. Consequently, according to the invention, at least the lateral face(s) of the balance spring in this contact area are coated with a layer of hard ceramic material which protects the underlying material from wear during contact between the balance spring and the pin.

The ceramic layer is preferably made of a carbide, such as, for example, SiC. It may also be made of a nitride such as, for example, $Si_3N_4$, of an oxide such as, for example, $ZrO_2$ $Al_2O_3$, $TiO_2$ or of a boride such as $TiB_2$. This layer has a thickness comprised between 5 and 100 nm and, preferably, between 20 and 50 nm.

According to a preferred variant, the underlying material is a constituent material of a layer having an antistatic function and acting as a moisture barrier. Preferably, this layer is metal and formed of a stainless and non-magnetic metal such as gold, platinum, rhodium, palladium, tantalum, chromium, vanadium, etc. Typically, this layer has a thickness less than or equal to 100 nm.

According to another variant, the wear-resistant ceramic layer is also electrically conductive and moisture-resistant. In which case, the aforecited layer having an antistatic function and acting as a moisture barrier is no longer required. In this variant, the conductive ceramic layer can be made of an oxide such as $SnO_2$:F, which is a fluoride-doped tin oxide, of an indium tin oxide (ITO), ZnO, which is a zinc oxide sometimes doped with aluminium (ZnO:Al), etc. It may also be a boride such as $TiB_2$ which is conductive.

Preferably, this layer having an antistatic and moisture barrier function, whether it is the aforecited metal layer or the aforecited conductive ceramic layer, itself coats a layer, referred to as the temperature compensation layer, which has the function of compensating for variations in the thermoelastic coefficient of the core with temperature. For example, this temperature compensation layer is formed of silicon oxide ($SiO_2$). Its thickness is adapted to take account of the effect of the conductive and wear-resistant layers on the thermal behaviour of the balance spring.

Figure 1B:
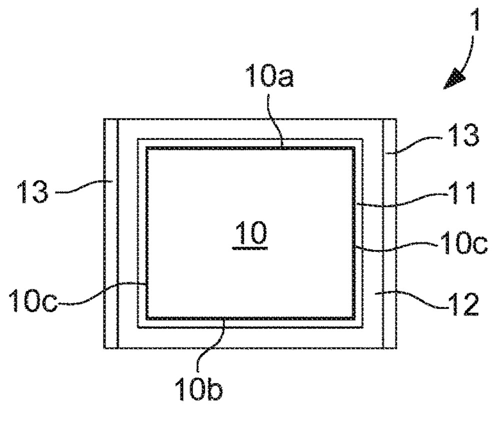
FIG. 1B is a cross-section along axis A-A of the outer coil of the balance spring of FIG. 1A.

The balance spring 1 represented in detail in FIG. 1B for the preferred variant thus has a core 10 made of silicon, quartz or, generally, ceramic. This core typically has a quadrilateral shape with an upper face 10*a* connected to a lower face 10*b* by two lateral faces 10*c*. This core 10 is preferably wholly or partly coated with temperature compensation layer 11. In the case of a silicon core, one or more of the core faces is thus coated with a layer 11 formed of $SiO_2$. The core is thus coated on one or more of its faces with metal layer 12 having an antistatic and moisture barrier function. Then, at least one or both lateral faces 10*c* of core 10, which is pre-coated with layers 11 and 12, is coated with the hard ceramic layer 13 in the area where contact occurs during use with the pin or pins. The present invention does not preclude the hard layer extending beyond the contact area. Thus, the hard layer extends over at least one portion of outer coil 5 in proximity to the end thereof. Advantageously, the portion extends on an arc of a circle a comprised between 10 and 60° and, preferably, between 30 and 40° (FIG. 1A). Said portion extends on an arc of a circle sufficient to ensure that, for any arrangement of the pins within the balance/balance spring assembly, the lateral face (s) intended to be in the contact area are properly coated with the hard layer.

The balance spring is made by the manufacturing method which comprises the following successive steps, described, by way of example, for a silicon balance spring. The balance spring with its silicon core can be obtained from a silicon wafer (wafer process). In a known manner, it is possible, for example, to perform wet chemical etching, plasma dry etching or reactive ion etching (RIE) using masks suitable for the desired balance spring contour. The silicon dioxide temperature compensation layer is obtained by thermal oxidation of one or more of the core faces. Then, if the anti-wear ceramic layer is not conductive, the metal layer is deposited on one or more of the core faces. The conductive layer is deposited by means of various known processes, such as sputtering, physical vapour deposition, ion implantation or electrolytic deposition. Finally, the ceramic layer according to the invention is deposited by PVD, CVD (chemical vapour deposition) ALD (atomic layer deposition) etc. on the lateral face(s) of the outer coil portion. It will be noted that the present invention does not preclude the ceramic layer also being deposited on the upper and lower faces on this portion.

Further, the present invention does not preclude the conductive or non-conductive ceramic layer being directly deposited on one or both of the lateral faces of the silicon core in the contact area. Said core is thus devoid of the $SiO_2$ temperature compensation layer and of the metal layer in the contact layer but provided with these layers over all or part of the core outside this area. The hard layer is thus a nitride-based, carbide-based or oxide-based ceramic layer with the exception in this latter case of $SiO_2$, intended to protect the silicon core from wear in the contact area.

KEY (1) Balance spring
(2) Inner end
(3) Collet
(4) Shaft
(5) Outer coil
(6) Inner end
(7) Balance spring stud (8) Balance (9) Pin (10) Core a. Upper face b. Lower face c. Lateral face (11) Underlying layer, also referred to as the temperature compensation layer (12) First layer also referred to as the metal layer (13) Second layer, also referred to as the ceramic layer, or combined layer

The invention claimed is:

1. A timepiece comprising a balance having fixed inertia and an index assembly comprising two index pins (9), wherein the timepiece includes a balance spring (1) which is formed of a core (10) having lateral faces (10*c*) connecting an upper face (10*a*) to a lower face (10*b*), said balance spring (1) comprising on one of the lateral faces (10) in one portion of the outer coil (5), a coating formed of one or more layers, said coating being characterized in that it includes:

two layers with a first electrically conductive layer (12) coated with a second outer layer (13) made of a ceramic, said second layer arranged to contact at least one of said index pins, or a combined layer arranged to come into contact with at least one of said index pins, said combined layer (13) being made of an electrically conductive ceramic.

2. The timepiece according to claim 1, characterized in that said second outer layer (13) is made of a ceramic based on carbides, nitrides, borides or oxides.

3. The timepiece according to claim 2, characterized in that said second outer layer (13) is made of a ceramic based on silicon carbide.

4. The timepiece according to claim 1, characterized in that the combined layer (13) is made of a ceramic based on doped oxides or based on borides.

5. The timepiece according to claim 4, characterized in that the combined layer (13) is made of a fluoride-doped tin dioxide, an indium and tin oxide, a zinc oxide doped with aluminium, or a titanium boride.

6. The timepiece according to claim 1, characterized in that said portion extends over the outer coil (5) on an arc of a circle comprised between 10° and 60°.

7. The timepiece according to claim 1, characterized in that the second outer layer (13) or the combined layer (13) has a thickness comprised between 5 and 100 nm.

8. The timepiece according to claim 1, characterized in that the coating further includes a layer (11) underlying the first layer (12) or underlying the combined layer (13), said underlying layer (11) compensating for variations in the thermoelastic coefficient of the core (10) with temperature.

9. The timepiece according to claim 8, characterized in that the core (10) is made of silicon and said underlying layer (11) is made of silicon dioxide.

10. The timepiece according to claim 1, characterized in that the first layer (12) is a metal layer.

11. The timepiece according to claim 10, characterized in that the first layer (12) is made of a metal chosen from among gold, platinum, rhodium, palladium, tantalum, chromium and vanadium.

12. The timepiece according to claim 1, characterized in that each of the lateral faces (10*c*) includes in said portion of the outer coil (5) a first layer (12) and a second outer layer (13) or the combined layer (13).

13. The timepiece according to claim 12, characterized in that each of the lateral faces (10*c*) includes in said portion of the outer coil (5), the layer (11) underlying the first layer (23) or underlying the combined layer (13).

* * * * *